Feb. 11, 1958  B. F. WILEY  2,822,688
FLOWMETER
Filed Jan. 24, 1955  2 Sheets-Sheet 1

INVENTOR.
B. F. WILEY
BY Hudson & Young
ATTORNEYS

Feb. 11, 1958   B. F. WILEY   2,822,688
FLOWMETER
Filed Jan. 24, 1955   2 Sheets-Sheet 2

INVENTOR.
B. F. WILEY
BY *Hudson & Young*
ATTORNEYS

United States Patent Office 2,822,688
Patented Feb. 11, 1958

2,822,688
FLOWMETER

Bruce F. Wiley, Bartlesville, Okla., assignor to Phillips Petroleum Company, a corporation of Delaware Application January 24, 1955, Serial No. 483,777

5 Claims. (Cl. 73—155)

This invention relates to apparatus to measure fluid flow through bore holes. In another aspect it relates to apparatus for determining the rate fluid is injected from a bore hole into surrounding formations. In still another aspect it relates to electrical circuits for operating flow meters disposed in inaccessible locations with the use of a minimum number of connecting leads.

In certain petroleum operations it is desirable to inject fluids through a bore hole into surrounding earth formations. This is particularly true in water flooding operations wherein water is pumped through a first bore hole to enter surrounding formations and force oil deposited therein into an adjoining producing well. It is desirable to determine the rate fluid is injected into various sections of the bore hole in order to control the rate at which oil is forced through the surrounding formations. The obvious method of measuring flow rates in bore holes is to position a conventional flowmeter at different depths within the bore hole and measure the total flow therepast. However, this procedure requires a previous caliper survey of the bore hole diameter and is not entirely reliable. Water may accumulate in cavities in the bore hole to cause erroneous readings.

In accordance with the present invention there is provided an improved flow meter which includes a pair of parallel flow paths between sections of a well separated by a packer. The first flow path has a flow indicating device positioned therein which also functions to direct a portion of the total flow into this path. Means are provided to determine the condition of null flow through the second path. At the condition of null flow through the second path, the measured flow through the first path represents the total flow through the meter. Because there is no pressure difference across the packer, the total flow is through the first path. This eliminates the need of an absolutely fluid-tight packer, which obviously is difficult to provide. The null flow condition is determined by separate temperature sensitive resistance elements positioned in the second path and at a point of reference temperature, such as adjacent the inlet of the first flow path. The temperature sensitive resistance elements are connected in a bridge circuit which provides an electrical signal representative of the temperature difference therebetween. A first circuit is provided to transmit this signal to the surface of the bore hole over a pair of conducting cables. The output signal from the flow measuring means in the first flow path is transmitted to the surface over the same conducting cables which are employed to transmit the bridge unbalance signal. An electric motor is employed to rotate an impeller in the first flow path. This motor is energized by a circuit comprising a single conductor and a grounded return path. The speed of rotation of the motor driven impeller is measured by a telemetering circuit which transmits pulses to the surface at a frequency proportional to the frequency of rotation of the impeller. A temperature sensitive resistance element having a negative coefficient of thermal resistivity is included in the telemetering circuit to prevent the amplitude of the signal from rising excessively when high speeds of rotation are being measured. This reduces the interference between the several circuits which are conducted over common cables.

Accordingly, it is an object of this invention to provide improved apparatus to measure flow rates at inaccessible locations.

Another object is to provide apparatus for measuring the rates of fluid flow from a bore hole into surrounding earth formations.

A further object is to provide an electrical circuit to transmit information from a bore hole to the surface over a minimum number of electrical conductors.

Other objects, advantages and features of the invention should become apparent from the following detailed description taken in conjunction with the accompanying drawing in which.

Figures 1, 2, 3, 4:
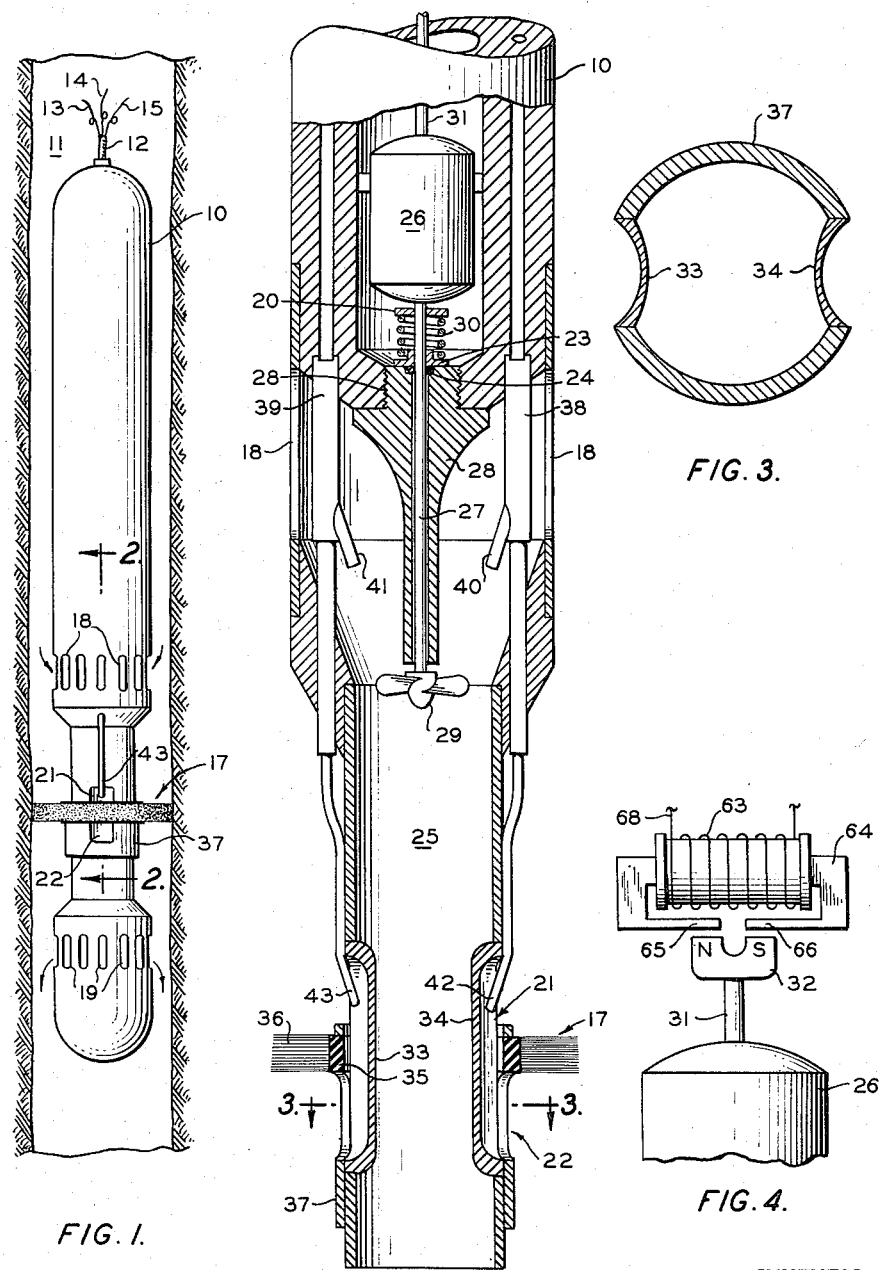
Figure 1 illustrates the water injectivity meter apparatus of this invention positioned within a bore hole.
Figure 2 is a vertical sectional view taken along line 2—2 in Figure 1.
Figure 3 is a horizontal sectional view taken along line 3—3 in Figure 2.
Figure 4 is a schematic view of the motor speed telemetering transmitter.

Referring now to the drawing in detail and to Figure 1 in particular, there is shown a fluid flow measuring assembly 10 which is positioned within a bore hole 11 by a cable 12. The upper end of cable 12 is connected to suitable hoisting equipment at the surface of the bore hole so that the assembly 10 can be lowered to measurable depths. Cable 12 contains three electrical conductors 13, 14 and 15 which connect the electrical components contained within housing 11 to the indicating equipment at the surface. A flexible packing device 17 is secured to assembly 10 and extends outwardly therefrom to engage the wall of the bore hole in a fluid-tight fit. Assembly 10 is provided with a plurality of first inlet openings 18 about packer 17. Fluid enters the assembly from the bore hole through openings 18 and is transmitted downwardly through the assembly and out into the bore hole through a plurality of openings 19 positioned below packer 17. A second flow path is provided between the regions above and below packer 17 by openings 21 and 22 in assembly 10 adjacent packer 17.

The center portion of assembly 10 is illustrated in detail in Figure 2. This portion of the assembly defines a passage 25 which communicates between inlet openings 18 and outlet openings 19, the latter not being shown in Figure 2. A first drive shaft 27 of motor 26 extends downwardly through a bushing 28. A rotating collar 20 is secured to shaft 27 beneath motor 26. A second collar 23 is positioned about shaft 27 beneath collar 20 and spaced therefrom. Collar 23 is free to move longitudinally on shaft 27, but rotates therewith. A compression spring 30 is disposed between collars 20 and 23 to force the latter into fluid-tight engagement with an O-ring seal 24 carried by bushing 28. An impeller 29 is mounted on the lower end of drive shaft 27. A second drive shaft 31 extends upwardly from motor 26 to support a magnet 32, as illustrated in Figure 4. The second flow path between the regions above and below packer 17 is defined by a pair of concave plates 33 and 34 which are attached to the housing of assembly 10 adjacent packer 17. Packer 17, which can be in the form of an annular rubber member 35 having a plurality of bristles 36 extending outwardly therefrom, is mounted at approximately the midpoint of plates 33 and 34 by a support plate 37. Bristles 36 are impregnated with a heavy grease to form a fluid-tight barrier.

A pair of support rods 38 and 39 extends longitudinally through assembly 10. These rods position respective first temperature sensitive resistance elements 40 and 41 adjacent inlet openings 18. Rods 38 and 39 also position respective second temperature sensitive resistance elements 42 and 43 adjacent fluid opening 21. The rods contain electrical leads which extend from these resistance elements to the down-hole electrical indicating circuit of Figure 5 which is mounted within the upper portion of assembly 10.

Figure 5:
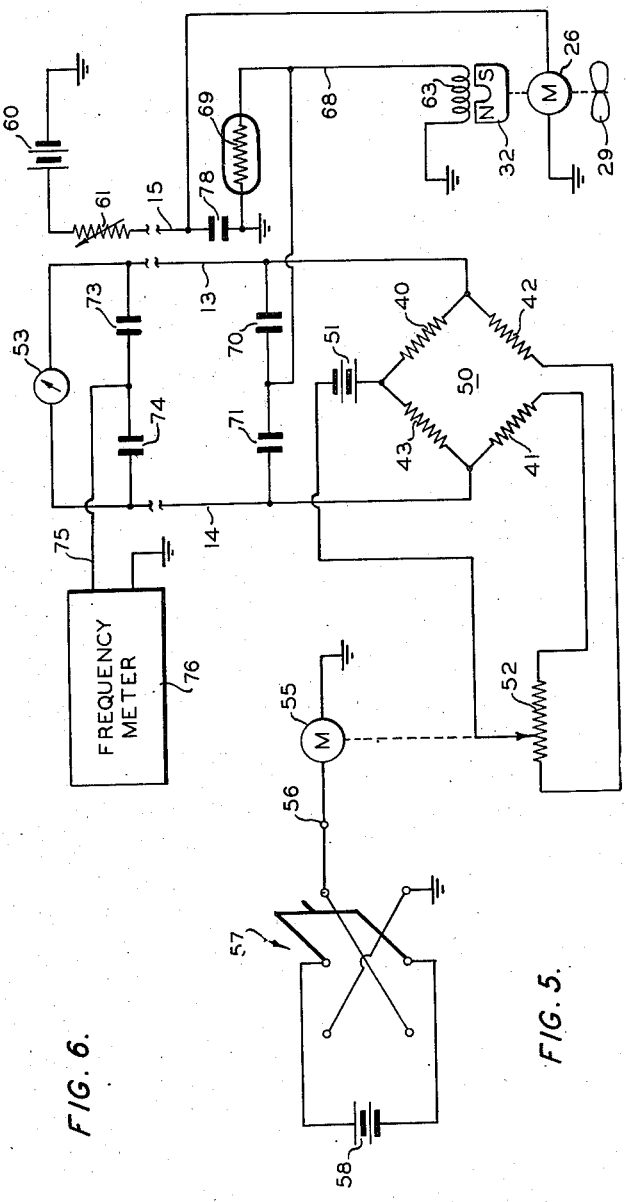
Figure 5 is a schematic circuit diagram of the electrical components of the flow measuring apparatus.

The electrical circuit elements associated with the flow measuring apparatus of this invention are illustrated schematically in Figure 5. Temperature sensitive resistance elements 40, 41, 42 and 43 are connected in the respective arms of a bridge circuit 50. Elements 40 and 41 are connected in opposite arms of the bridge circuit, as are elements 42 and 43. The output signal from the bridge circuit thus provides a measurement representative of temperature differences between fluid inlets 18 and 21. Resistance elements 40, 41, 42 and 43 are selected to have high temperature coefficients of resistivity. Suitable thermistors having negative coefficients of thermal resistivity are available commercially and provide high sensitivity. The junction of bridge circuit 50 between elements 40 and 43 is connected to one terminal of a direct current voltage source 51. The second terminal of voltage source 51 is connected to the contactor of a potentiometer 52. The first end terminal of potentiometer 52 is connected to one end terminal of element 41, and the second end terminal of potentiometer 52 is connected to one end terminal of element 42. The junction between elements 40 and 42 is connected to a first conductor 13 which extends to the surface through cable 12. The junction between elements 41 and 43 is connected to conductor 14 which also extends to the surface through cable 12. A direct current indicating meter 53 is connected between conductors 13 and 14 at the surface.

Bridge circuit 50 is balanced initially when the flow measuring assembly is positioned at, or near, the surface of the bore hole and with a small flow therethrough to eliminate effect of varying convection currents. This initial balance is accomplished by adjustment of the contactor of potentiometer 52 until a null reading is obtained on meter 53. In order to eliminate the necessity of opening assembly 10 to make this adjustment, a small reversible direct current motor 55 is mounted within the assembly. The drive shaft of motor 55 is mechanically connected to the contactor of potentiometer 52. One terminal of motor 55 is connected to ground and the second terminal thereof is connected to a terminal 56 which is mounted on the outside surface of assembly 10 so that one end terminal of a double-pole double-throw reversing switch 57 can be connected thereto. The corresponding second end terminal of switch 57 is connected to ground. The center terminals of switch 57 are connected to the respective end terminals of a voltage source 58. Motor 55 can thus be driven in either direction to move the contactor of potentiometer 55 until a null signal is observed on meter 53. The bridge circuit is then in a condition of initial balance.

Motor 26 is energized from a source of direct current 60 which is positioned at the surface. One terminal of current source 60 is connected to ground, as is one terminal of motor 26. The second terminal of current source 60 is connected to the second terminal of motor 26 through a variable resistor 61 and conductor 15, the latter being contained within cable 12. The ground terminals of motors 26 and 55 can be connected to the metal housing of cable 12. The speed of rotation of motor 26 is adjusted by resistor 61 which varies the flow of current. Motor 26 rotates impeller 29 to pump fluid from inlet 18 through passage 25 to outlet 19.

Motor 26 also rotates magnet 32 to generate an electrical signal representative of the speed of rotation. With reference to Figure 4, a coil 63 is mounted in assembly 10 above magnet 32. An armature 64 extends through coil 63 and terminates in spaced pole pieces 65 and 66 adjacent the poles of magnet 32. Rotation of magnet 32 thus induces a voltage across the end terminals of coil 63 at a frequency proportional to the speed of rotation of magnet 32. The first end terminal of coil 63 is connected to ground and the second end terminal thereof is connected to a lead 68. Lead 68 is connected to ground through a temperature sensitive resistance element 69 which has a negative coefficient of thermal resistivity. Lead 68 is also connected through capacitors 70 and 71 to respective conductors 13 and 14. Capacitors 73 and 74 are connected in series relation between conductors 13 and 14 at the surface. A lead 75 is connected between the junction between capacitors 73 and 74 and the first input terminal of a frequency meter 76. The second input terminal of meter 76 is connected to ground. The alternating voltage induced in coil 63 by rotation of motor 32 is thus transmitted to the surface over conductors 13 and 14 and is applied to meter 76. A capacitor 78 is connected between conductor 15 and ground to prevent current flow through coil 63 from source 60.

Figure 6:
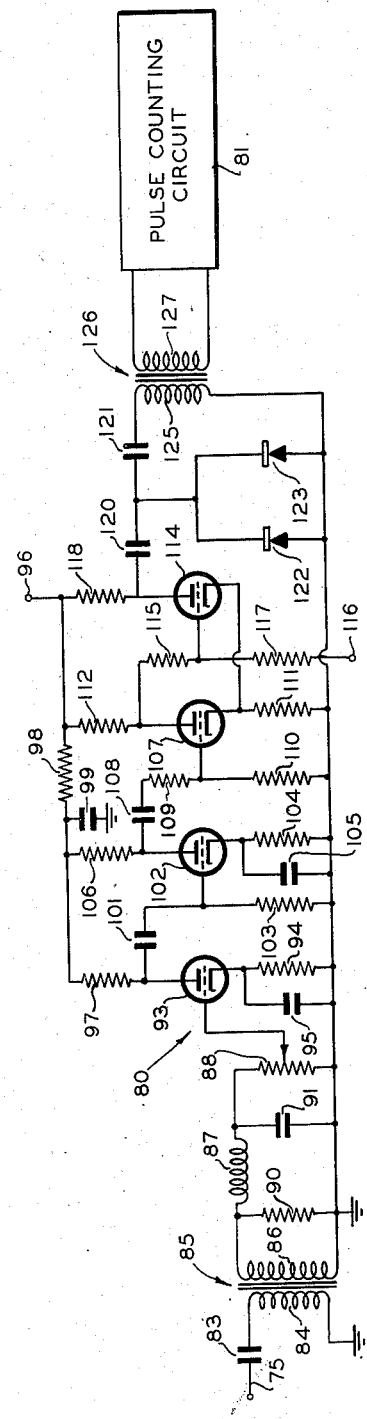
Figure 6 is a schematic circuit diagram of the frequency meter of Figure 5.

A suitable frequency meter 76 is illustrated in Figure 6. The voltage induced in coil 63 varies in substantially a sinusoidal fashion. This voltage is applied to the input terminals of a pulse shaping circuit 80 which provides sharp output pulses of a frequency proportional to the frequency of the input signal applied thereto. These pulses are measured by a conventional counting circuit 81. Lead 75 of Figure 5 is connected through a capacitor 83 to the first end terminal of the primary winding 84 of a transformer 85. The second end terminal of transformer winding 84 is connected to ground. The first end terminal of the secondary winding 86 of transformer 85 is connected through an inductor 87 to one end terminal of a potentiometer 88. The second end terminal of transformer winding 86 is connected to ground as is the second end terminal of potentiometer 88. A resistor 90 is connected in parallel with transformer winding 86, and a capacitor 91 is connected in parallel with potentiometer 88. The contactor of potentiometer 88 is connected to the control grid of a first triode 93. The cathode of triode 93 is connected to ground through a resistor 94 which is shunted by a capacitor 95. The anode of triode 93 is connected to a positive potential terminal 96 through series connected resistors 97 and 98. A capacitor 99 is connected between ground and the junction between resistors 97 and 98.

The anode of triode 93 is connected through a capacitor 101 to the control grid of a second triode 102. The control grid of triode 102 is connected to ground through a resistor 103. The cathode of triode 102 is connected to a ground through a resistor 104 which is shunted by a capacitor 105. The anode of triode 102 is connected to potential terminal 96 through series connected resistors 106 and 98. The anode of triode 102 is also connected to the control grid of a third triode 107 through a capacitor 108 and a resistor 109 which are connected in series relation. The control grid of triode 107 is connected to ground through a resistor 110. The cathode of triode 107 is connected to ground through a resistor 111. The anode of triode 107 is connected to terminal 96 through a resistor 112. The anode of triode 107 is also connected to the control grid of a triode 114 through a resistor 115. The control grid of triode 114 is connected to a negative potential terminal 116 through a resistor 117. The cathode of triode 114 is connected to the cathode of triode 107. The anode of triode 114 is connected to terminal 96 through a resistor 118. The anode of triode 114 is also connected to one terminal of the primary winding 125 of a transformer 126 through series connected capacitors 120 and 121. The second terminal of transformer winding 125 is connected to ground. A first rectifier 122 is connected between ground and the junction between capacitors 120 and 121, and a second rectifier 123 is connected in parallel with rectifier 122. The end terminals of the secondary winding 127 of transformer 126 are connected to the input terminals of pulse counting circuit 81.

The circuit illustrated in Figure 6 serves to convert a substantially sinusoidal input signal into output pulses which are counted by circuit 81. Inductor 87 and capacitor 91 function as a filter to block any high frequency extraneous noise signals which may be present. The input signal is amplified by triodes 93 and 102. Triode 107 is biased so as to conduct only when an input signal of preselected magnitude is applied to the control grid thereof. Thus, triode 107 conducts during only a portion of each cycle of the input signal. Triode 114 normally is conductive in the absence of an input signal. Conduction by triode 107 results in the control grid of triode 114 being driven more negative to diminish or extinguish current flow through triode 114. The voltage at the anode of triode 114 thus increases. Capacitor 120 charges through diodes 122 and 123 when the potential at the anode of triode 114 increases and discharges through capacitor 121 and transformer winding 125 when the potential at the anode of triode 114 decreases. The frequency of the pulses transmitted by transformer 126 is thus representative of the frequency of the output signal from coil 63.

In operating the flow measuring apparatus of this invention the bridge circuit initially is balanced, as previously described. The assembly is then lowered into the well to a selected depth. Water is pumped into the well at the surface. The flow through the well past packer 17 can follow one of two paths: from openings 18 through passage 25 to openings 19, or from openings 21 to openings 22. Impeller 29 is rotated by motor 26 at a speed such that water is pumped through passage 25 at a rate to eliminate flow from openings 21 to openings 22. The increased flow created by impeller 29 effectively eliminates the pressure differential across packer 17. Thus, there is no tendency for fluid to leak past packer 17, and the total fluid flow is through passage 25.

The condition of null flow between openings 21 and 22 is determined by bridge circuit 50. The bridge is unbalanced a maximum amount when the total flow is past elements 40 and 41 and there is zero flow past elements 42 and 43. This results from the cooling effect of the flowing fluid on elements 40 and 41. This unbalance is observed by the deflection of meter 53. The speed of motor 26 is adjusted by variable resistor 61 to obtain this condition. The speed of rotation of motor 26 is measured by the frequency of the alternating signal induced in coil 63. This signal is transmitted over conductors 13 and 14.

An important feature of this invention is the temperature sensitive resistor 69 which has a negative coefficient of thermal resistivity. It has been found that undesirable interference often results between the individual circuits if the amplitude of the output signal from coil 63 rises excessively, as may result at high speeds of rotation. For example, a high voltage alternating current signal can cause excessive heating in the bridge circuit and can cause erratic operation of meter 53. These effects are avoided however, by the use of resistor 69 which has less resistance as the output voltage from coil 63 increases. This results from the fact that the resistance of element 69 decreases as more current is passed therethrough. The decreased resistance shunts a greater portion of the signal to ground so that the signal transmtted to frequency meter 76 remains of substantially constant amplitude.

While the flow measuring apparatus of this invention has been described in conjunction with a present preferred embodiment, it should be evident that the invention is not limited thereto.

What is claimed is:

1. Flow measuring apparatus comprising a housing adapted to be lowered into a well, a packer secured to said housing and extending outwardly therefrom to engage the wall of the well, first conduit means carried by said housing to define a first flow path between regions of the well on opposite sides of said packer, second conduit means carried by said housing to define a second flow path between regions of the well on opposite sides of said packer, an impeller positioned in said first flow path, means to rotate said impeller at variable speeds to direct fluid through said first flow path, a magnet attached to said impeller to rotate therewith, a coil carried by said housing adjacent said magnet so that a first voltage is induced in said coil by rotation of said magnet, means connecting one terminal of said coil to a reference potential, a first temperature sensitive resistance element positioned in said first flow path, a second temperature sensitive resistance positioned in said second flow path, circuit means including said first and second temperature sensitive resistance elements to provide a second voltage representative of the temperature difference between said first and second elements, a transmission line connected at one end to said housing and insulated therefrom, means to apply said first and second voltages to said one end of said line, a third resistance element having a negative coefficient of thermal resistivity connected between the second terminal of said coil and said reference potential, means connected to the second end of said line to measure the amplitude of said second voltage, a frequency meter and means connecting said frequency meter to the second end of said line to measure the frequency of said first voltage.

2. Flow measuring apparatus comprising a housing adapted to be lowered into a well, a packer secured to said housing and extending outwardly therefrom to engage the wall of the well, first conduit means carried by said housing to define a first flow path between regions of the well on opposite sides of said packer, second conduit means carried by said housing to define a second flow path between regions of the well on opposite sides of said packer, an impeller positioned in said first flow path, means to rotate said impeller at variable speeds to direct fluid through said first flow path, a magnet attached to said impeller to rotate therewith, a coil carried by said housing adjacent said magnet so that a first voltage is induced in said coil by rotation of said magnet, means connecting the first terminal of said coil to a reference potential, a first temperature sensitive resistance element positioned in said first flow path, a second temperature sensitive resistance element positioned in said second flow path, a Wheatstone bridge network having said first and second resistance elements connected in adjacent arms thereof, a source of direct current connected between first opposite terminals of said bridge network, a first lead connected to one of the second opposite terminals of said bridge network, a second lead connected to the second of the second opposite terminals of said bridge network, first and second capacitors connected in series relationship with one another between said first and second leads, means connecting the first terminals of said first and second capacitors which are connected to one another to the second terminal of said coil, third and fourth capacitors connected in series relationship with one another between said first and second leads, a frequency meter, means connecting one input terminal of said frequency meter to the junction between said third and fourth capacitors, and means connecting the second input terminal of said frequency meter to said reference potential.

3. The combination in accordance with claim 2 further comprising a resistance element having a negative coefficient of thermal resistivity connected between the second terminal of said coil and said reference potential.

4. Telemetering apparatus comprising a coil, a magnet, means to rotate said magnet relative to and adjacent said coil at a speed representative of the information to be transmitted so that a voltage is induced across said coil, the frequency of said voltage being proportional to the speed of rotation of said magnet relative to said coil, a transmission line, means connecting one terminal of said coil to one end of said transmission line, means connecting the second terminal of said coil to a reference potential, a frequency meter connected between the second end of said transmission line and said reference potential, and a resistance element having a negative coefficient of thermal resistivity connected between the first terminal of said coil and said reference potential.

5. Flow measuring apparatus comprising a coil, an impeller adapted to be positioned in the flow to be measured so as to be rotated at a speed representative of the flow rate, a magnet attached to said impeller so as to be rotated adjacent said coil at a speed representative of the speed of rotation of said impeller, a transmission line, means connecting one terminal of said coil to one end of said transmission line, means connecting the second terminal of said coil to a reference potential, a frequency meter connected between the second end of said transmission line and said reference potential, and a resistance element having a negative coefficient of thermal resistivity connected between the first terminal of said coil and said reference potential.

References Cited in the file of this patent

UNITED STATES PATENTS

| | | |
|---|---|---|
| 2,249,751 | Doll | July 22, 1941 |
| 2,524,150 | Vincent | Oct. 3, 1950 |
| 2,683,224 | Cole | July 6, 1954 |
| 2,688,872 | Hartline et al. | Sept. 14, 1954 |
| 2,709,365 | Piety | May 31, 1955 |
| 2,729,102 | Worth | Jan. 3, 1956 |

FOREIGN PATENTS

| | | |
|---|---|---|
| 357,163 | Italy | Mar. 4, 1938 |